United States Patent [19]
Bennett et al.

[11] Patent Number: 5,552,504
[45] Date of Patent: Sep. 3, 1996

[54] SEMI-CRYSTALLINE CYCLOOLEFIN COPOLYMER FILM

[75] Inventors: Cynthia Bennett, Alzey; Michael-Joachim Brekner, Frankfurt; Jochen Coutandin, Langenlonsheim; Otto Herrmann-Schoenherr, Bensheim; Frank Osan, Kelkheim, all of Germany

[73] Assignee: Hoechst Aktiengesellschaft, Frankfurt am Main, Germany

[21] Appl. No.: 195,077

[22] Filed: Feb. 14, 1994

[30] Foreign Application Priority Data

Feb. 12, 1993 [DE] Germany .......................... 43 04 310.0

[51] Int. Cl.$^6$ .................. C08F 232/08; C08F 232/04; C08F 4/64
[52] U.S. Cl. .............. 526/348.1; 526/127; 526/132; 526/160; 526/161; 526/165; 526/281; 526/282; 526/308; 524/553; 524/554; 528/482; 528/493; 528/497
[58] Field of Search .................... 526/281, 282, 526/308, 160, 348.1, 127, 132, 161, 165; 524/553, 554; 528/482, 493, 497

[56] References Cited

U.S. PATENT DOCUMENTS

| | | | |
|---|---|---|---|
| 4,935,475 | 6/1990 | Kishimura et al. | 526/169.2 |
| 5,324,801 | 6/1994 | Brekner et al. | 526/160 |
| 5,359,001 | 10/1994 | Epple et al. | 525/97 |

FOREIGN PATENT DOCUMENTS

| | | |
|---|---|---|
| 0277004 | 8/1988 | European Pat. Off. . |
| 0310394 | 4/1989 | European Pat. Off. . |
| 0384694 | 8/1990 | European Pat. Off. . |
| 0503422 | 9/1992 | European Pat. Off. . |
| 0566988 | 10/1993 | European Pat. Off. . |
| 224538 | 7/1985 | Germany . |
| 241971 | 1/1987 | Germany . |
| 0504418 | 9/1992 | Japan . |

OTHER PUBLICATIONS

J. L. Throne, Plastics Process Engineering, Marcel Dekker, Inc., N.Y., 442–3 (1979).

S. S. Schwartz et al, Plastics Materials and Processes, Van Nostrand Reinhold Co., N.Y., 592, 594 (1982).

Mislow, K., "Einfhrung in die Stereochemie (Introduction to Stereochemistry)", *Verlag Chemie*, 1st Edition 1967, p. 23 et seq.

*Primary Examiner*—Fred M. Teskin
*Attorney, Agent, or Firm*—Foley & Lardner

[57] ABSTRACT

A film including semi-crystalline cycloolefin copolymers which have a content of catalyst residues of <100 ppm and their use as capacitor films, reproduction films, film keyboards and film switches, substrates for liquid crystal displays and packaging films.

21 Claims, 1 Drawing Sheet

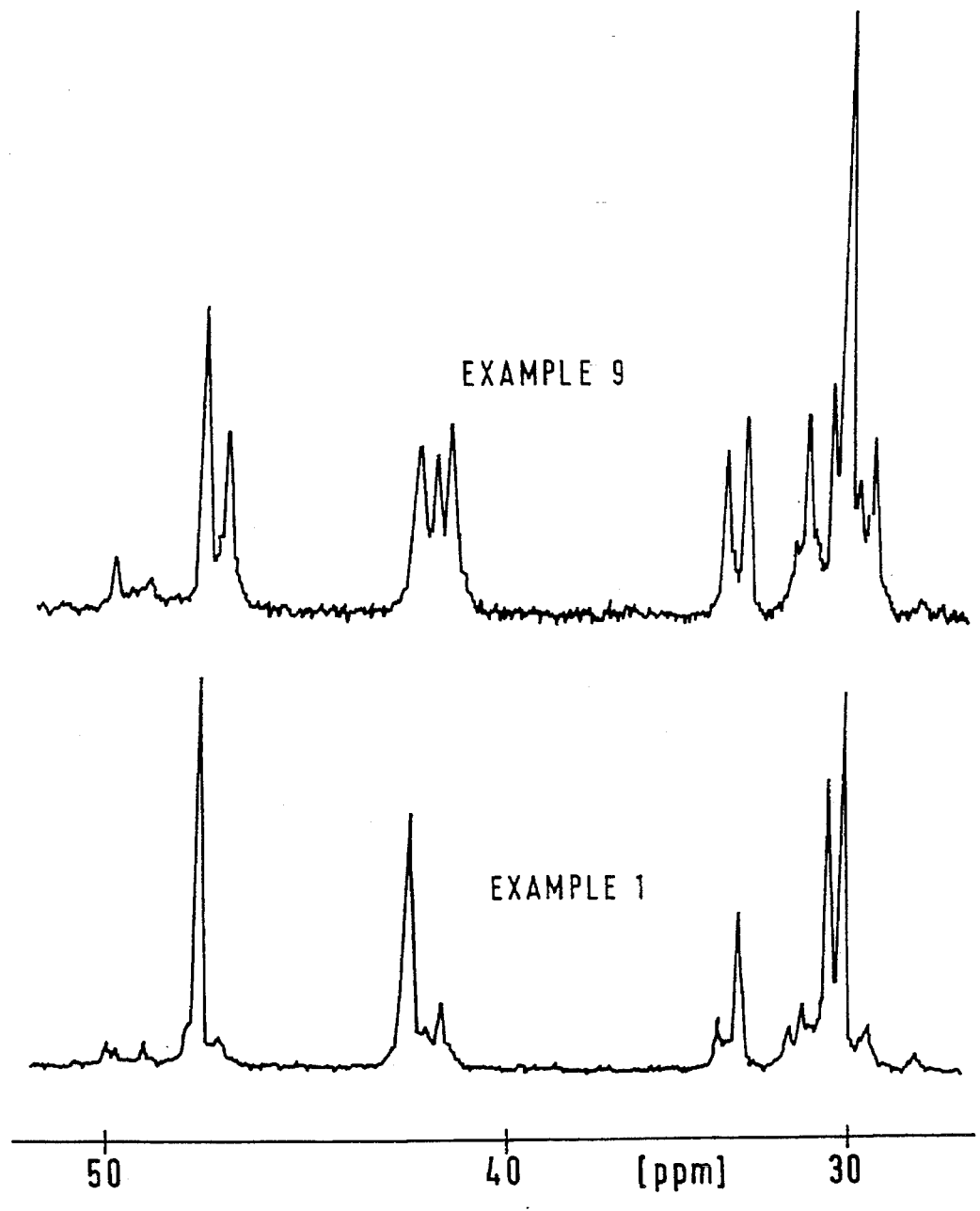

SEMI-CRYSTALLINE CYCLOOLEFIN COPOLYMER FILM

BACKGROUND OF THE INVENTION

1. Field of the Invention

The invention relates to semi-crystalline films of cycloolefin copolymers, a process for the production of such films and various materials made from such films.

2. Description of Related Art

Cycloolefin copolymers have the following properties that are advantageous specifically for films:

high transparency (for optical uses)

good dielectric properties (as a capacitor dielectric)

good solvent resistance to protic polar solvents, such as water, acetone, alcohols or dimethylformamide, and to aqueous acids and alkalis high softening temperatures, in particular, at a high cycloolefin content (for high temperature uses) and good gas barriers (for uses in the packaging sector).

Films prepared from amorphous cycloolefin copolymers are known. Particularly, DD-A 224 538 and DD-A 241 971 describe cast films of ethylene/norbornene copolymers. EP-A 0 384 694 also describes films of cyclic copolymers. Despite a few exceptions, however, the cycloolefinic starting materials mentioned therein all are amorphous.

One primary disadvantage of many amorphous cycloolefin copolymer films is that their solvent resistance is too low with respect to aprotic, nonpolar solvents, such as aliphatic or aromatic hydrocarbons. This disadvantage typically excludes films prepared from these copolymers from many fields of use.

EP-A 384 694 discloses semi-crystalline cycloolefin copolymers having a degree of crystallinity of 0 to 10%, which at the same time are described as having a glass transition temperature of 50° to 230° C. Some experiments have shown, however, that when the catalysts according to EP-A-0 384 694 are used, polyethylene contents, which are semi-crystalline, are formed as a secondary reaction in addition to the amorphous cycloolefin copolymers so that the amorphous cycloolefin copolymer with its added polyethylene content appears overall to be semi-crystalline. The partial crystallinity of the films described therein typically is so low that no melting point can be observed in the DSC measurement curve. It has furthermore been found that the melting point of the cycloolefin copolymers described as semi-crystalline in EP-A 384 694 is below 135° C., which is typical of ethylene sequences. Cycloolefin copolymers which are semi-crystalline as defined in the present invention, however, are not described in EP-A 384 694.

Some of the metallocene catalysts described in EP-A0 503 422 are known to be useful in preparing semi-crystalline cycloolefin copolymer films. During processing via the melt, these products have proven to have low thermal stability that has manifested itself in a brown coloration of the polymer. As thin pressed sheets, these copolymeric films exhibited a significant amount of gel particles (specks), that most likely formed as a result of local crosslinking of the polymer. In addition, clouding has been found which can be attributed to catalyst residues and which reduces the transparency of the product. Attempts to produce films from such polymers, in particular stretching attempts, were unsatisfactory, since the films tore around the specks. Thus, there exists a need to prepare a semi-crystalline cycloolefin copolymeric film that does not suffer from the disadvantages described above.

SUMMARY OF THE INVENTION

It is therefore an object of the present invention to provide a cycloolefin copolymer film which does not have the above-mentioned disadvantages of films of amorphous cycloolefin copolymers. Specifically, it is an object of the present invention to provide cycloolefin copolymer films having a high resistance to chemicals, improved dimensional stability, increased tensile E modulus and better stretchability.

In accordance with these objectives, there is provided semi-crystalline cycloolefin copolymer films prepared with the aid of selected metallocene catalysts, such as those described in EP-A-0 503 422 the disclosure of which is incorporated by reference herein. It has been found that these cycloolefin copolymers are suitable for production of films having the requisite properties if the content of catalyst residues, in particular those containing aluminum, is <100 ppm.

The cycloolefin copolymer utilized in the production of the films according to the present invention usually is obtained by polymerization of 0.1 to 99.9% by weight, based on the total amount of monomers, of at least one monomer of the formulae I, II, III, IV, V, VI, VII, VIII or IX

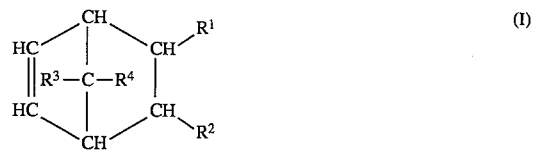

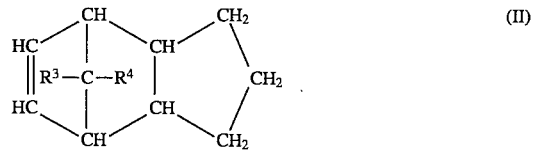

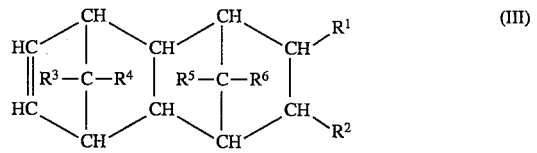

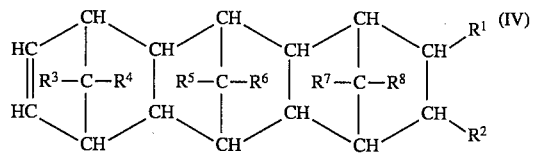

-continued

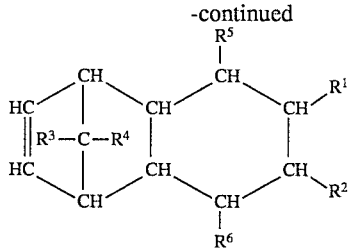
(V)

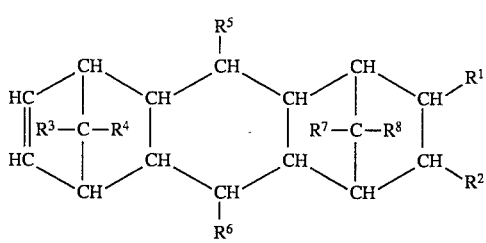
(VI)

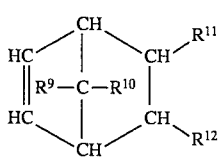
(VII)

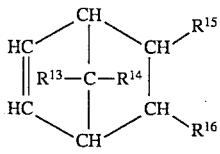
(VIII)

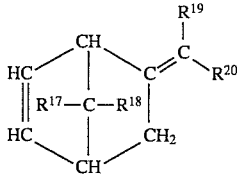
(IX)

wherein:

$R^1$ to $R^8$ are the same or different and each represent a hydrogen atom, a $C_6$–$C_{16}$-aryl or a $C_1$–$C_8$-alkyl radical, wherein the various groups in the aforementioned formulae may have the same or a different meaning, and in wherein $R^9$ to $R^2$ are the same or different and each represent a $C_1$–$C_{16}$-alkyl, $C_2$–$C_6$-alkenyl or $C_6$–$C_{16}$-aryl radical, or in wherein the radical pairs $R^9/R^{10}$, $R^{11}/R^{12}$, $R^{13}/R^{14}$, $R^{15}/R^{16}$, $R^{17}/R^{18}$ and/or $R^{19}/R^{20}$, together with the carbon atom or atoms to which they are bonded, form a $C_4$–$C_8$-cycloalkyl radical, and 99.9 to 0.1% by weight, based on the total amount of monomers, of at least one acyclic olefin of the formula X $$H_2C=CH—R^{21} \qquad (X)$$

in which $R^{21}$ is a hydrogen atom or a $C_1$–$C_{16}$-alkyl or $C_6$–$C_{16}$-aryl radical.

In accordance with a further object of the present invention, there are provided a variety of materials made from semi-crystalline cycloolefin copolymer films including capacitor films, reproduction films, film keyboards and switches, substrates for liquid crystal displays and packaging films.

In accordance with another embodiment of the present invention, there is provided a method of making a semi-crystalline cycloolefin copolymer film comprising polymerizing a cycloolefin and an olefin in the presence of a metallocene catalyst to prepare a cycloolefin copolymer, separating the cycloolefin copolymer and forming a film from the copolymer.

These and other objects of the invention will be readily apparent to those skilled in the art upon review, inter alia, of the following detailed description of the invention.

BRIEF DESCRIPTION OF THE DRAWINGS

FIG. 1 illustrates the $^{13}$C-NMR spectra for cycloolefin copolymers of the present invention (Example 1) and conventionally prepared cycloolefin copolymers (Example 9).

DETAILED DESCRIPTION

The glass transition temperatures $T_g$ of the semi-crystalline cycloolefin copolymers of the instant films typically are above 100° C., and the melting points $T_m$ usually are above 200° C. These copolymeric films, when transparent, can readily be subjected to thermoforming.

The cycloolefin copolymer utilized in the production of the films according to the present invention usually is obtained by polymerization of 0.1 to 99.9% by weight, based on the total amount of monomers, of at least one monomer of the formulae I, II, III, IV, V, VI, VII, VIII or IX

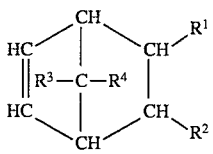
(I)

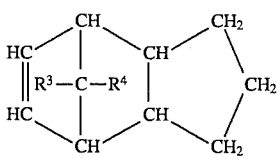
(II)

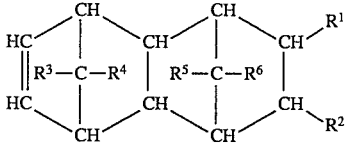
(III)

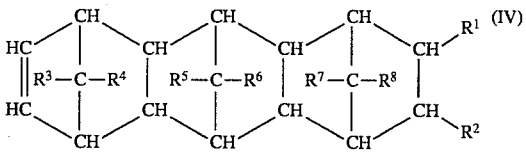
(IV)

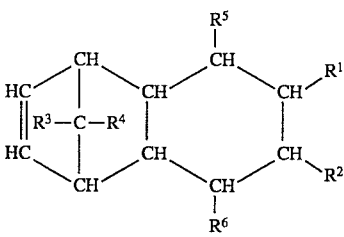
(V)

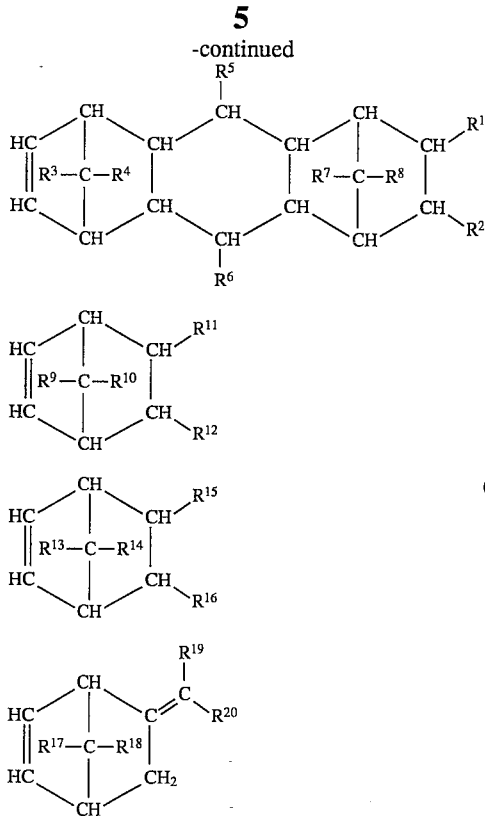

wherein:

R¹ to R⁸ are the same or different and each represent a hydrogen atom, a $C_6-C_{16}$-aryl or a $C_1-C_8$-alkyl radical, wherein the various groups in the aforementioned formulae may have the same or a different meaning, and in wherein R⁹ to R²⁰ are the same or different and each represent a $C_1-C_{16}$-alkyl, $C_2-C_{16}$-alkenyl or $C_6-C_{16}$-aryl radical, or in wherein the radical pairs $R^9/R^{10}$, $R^{11}/R^{12}$, $R^{13}/R^{14}$, $R^{15}/R^{16}$, $R^{17}/R^{18}$ and/or $R^{19}/R^{20}$, together with the carbon atom or atoms to which they are bonded, form a $C_4-C_8$-cycloalkyl radical, and 99.9 to 0.1% by weight, based on the total amount of monomers, of at least one acyclic olefin of the formula X

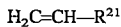  (X)

in which R²¹ is a hydrogen atom or a $C_1-C_6$-alkyl or $C_6-C_{16}$-aryl radical.

It has been found that semi-crystalline cycloolefin copolymers are typically formed when a metallocene catalyst of the formula XI is used.

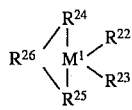  (XI)

wherein

M¹ represents titanium, zirconium, hafnium, vanadium, niobium or tantalum, and R²² and R²³ are the same or different and each represent a hydrogen atom, a halogen atom, a $C_1-C_{10}$-alkyl group, a $C_1-C_{10}$-alkoxy group, a $C_6-C_{10}$-aryl group, a $C_6-C_{10}$-aryloxy group, a $C_2-C_{10}$-alkenyl group, a $C_7-C_{40}$-arylalkyl group, a $C_7-C_{40}$-alkylaryl group or a $C_8-C_{40}$ -arylalkenyl group, R²⁴ and R²⁵ are the same or different and each represent a mono- or polynuclear hydrocarbon radical, that is capable of forming a sandwich structure with the central atom M¹, R²⁶ represents

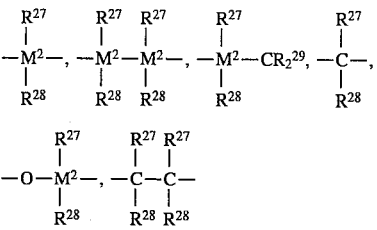

$BR^{28}$, $AlR^{28}$, —Ge—, —Sn—, —O—, —S—, SO, $SO_2$, $NR^{28}$, CO, $PR^{28}$ or $P(O)R^{28}$, wherein R²⁷, R²⁸ and R²⁹ are the same or different and each represent a hydrogen atom, a halogen atom, a $C_1-C_{10}$-alkylgroup, a $C_1-C_{10}$-fluoroalkyl group, a $C_6-C_{10}$-fluoroaryl group, a $C_6-C_{10}$-arylgroup, a $C_1-C_{10}$-alkoxy group, a $C_2-C_{10}$-alkenyl group, a $C_7-C_{40}$-arylalkyl group, a $C_6-C_{40}$-arylalkenyl group or a $C_7-C_{40}$-alkylaryl group, or R²⁷ and R²⁹ or R²⁸ and R²⁹, in each case form a cyclic ring with the atoms joining them, and M² represents silicon, germanium or tin.

The portion of the metallocene molecule formed by M¹ and the substituents R²⁴ and R²⁵ have $C_1$-symmetry or, if R²⁴ and R²⁵ are identical, they can be in the meso form. Metallocene catalyst as described above are useful in polymerizing the semi-crystalline cycloolefin copolymers of the present invention.

The polymerization of the semi-crystalline cycloolefin copolymers can be carried out in the presence of a cocatalyst which comprises, for example, an aluminoxane of the formula XII.

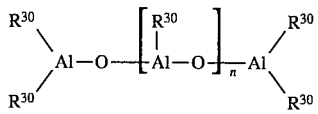  (XII)

of the linear type and/or of the formula XIII

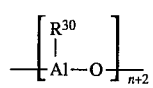  (XIII)

of the cyclic type, wherein, in the formulae XII and XIII, the radicals

R³⁰ are the same or different and each represents a $C_1-C_6$-alkylgroup, phenyl or benzyl and n is an integer from 0 to 50.

The polymerization reaction preferably is carried out in the liquid cycloolefin monomer in concentrated suspensions or concentrated solutions. During the polymerization reaction, at least one polycyclic olefin of the formula I, II, III, IV, V, VI, VII, VIII or IX, preferably a cycloolefin of the formula I or III, wherein R¹, R², R³, R⁴, R⁵, R⁶, R⁷ and R⁸ are the same or different and represent a hydrogen atom or a $C_1-C_8$-alkylradical, is polymerized. It is possible that similar radicals in the various formulae above have a different meaning. Thus, R¹ in formula (I) may have a the same or different meaning than R¹ in formula (III) R¹ in addition, R¹ in formula (I) may have the same or different meaning as R² in formula (I).

An acyclic olefin of the formula X wherein R¹⁸, R¹⁹, R²⁰ and R²¹ are the same or different and represent a hydrogen atom or a $C_1-C_8$-alkylradical usually is employed as the comonomer. Particularly preferred comonomers include ethylene or propylene.

More advantageously, copolymers of symmetric polycyclic olefins, preferably of the formulae I and III, with the acyclic olefins X are prepared. Throughout this description, "symmetric polycyclic olefins" denote, in particular, those compounds of the formulae I and III in which the substituents $R^1$ and $R^2$ are identical chemically and in their spatial arrangement. Particularly preferred cycloolefins are norbornene and tetracyclododecene. They preferably are prepared by copolymerizing with ethylene. Ethylene/norbornene copolymers are of particularly preferred.

Usually, the comonomers I to VI are copolymerized with the comonomers X in any desired ratio, but a ratio (comonomers I-IV:comonomers X) of between 45:55 and 55:45 mol % is advantageous. Ratios of about 50:50 mol % are particularly advantageous. The polycyclic olefin (I to IX) typically is utilized in an amount of about 0.1 to about 99.9% by weight, in each case based on the total amount of monomers. If dienes of the formulae VII, VIII and/or IX and/or monomers of the formulae I to VI that contain at least one further double bond in one of their radicals are employed, their incorporation ratio in the polymer is advantageously >0 to 5 mol %.

The concentration of the open-chain olefin stems from the solubility of the open-chain olefin in the reaction medium under the given pressure and given temperature. Suitable primary catalysts of the transition metal type comprise a metallocene of the formula XI

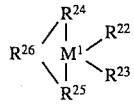

In formula XI, $M^1$ may be selected from titanium, zirconium, hafnium, vanadium, niobium and tantalum, preferably zirconium and hafnium.

$R^{22}$ and $R^{23}$ are the same or different and each represent a hydrogen atom, a $C_1-C_{10}$-, preferably $C_1-C_3$-alkyl group, a $C_1-C_{10}$-preferably $C_1-C_3$-alkoxygroup, a $C_6-C_{10}$-,preferably $C_6-C_8$-arylgroup, a $C_6-C_{10}$-preferably $C_6-C_8$-aryloxygroup, a $C_2-C_{10}$-preferably $C_2-C_4$-alkenylgroup, a $C_7-C_{40}$-,preferably $C_7-C_{10}$-arylalkylgroup, a $C_7-C_{40}$-, preferably $C_7-C_{12}$-alkylaryl group, a $C_8-C_{40}$-preferably $C_8-C_{12}$-arylalkenyl group or a halogen atom, preferably chlorine.

$R^{24}$ usually represents fluorenyl, indenyl or cyclopentadienyl and $R^{25}$ usually represents indenyl or cyclopentadienyl, it being possible for these radicals to be substituted and for $C_1$-symmetry to be present, or the two radicals are the same and are optionally substituted indenyl or substituted cyclopentadienyl (meso form).

$R^{26}$ represents a single- or multi-membered bridge which links the radicals $R^{24}$ and $R^{25}$ and usually represents

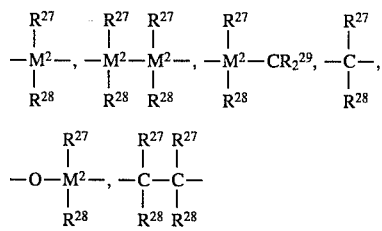

$BR^{27}$, $AlR^{27}$, —Ge—, —Sn—, —O—, —S—, SO, $SO_2$, $NR^{27}$, CO, $PR^{27}$ or $P(O)R^{27}$, wherein $R^{27}$, $R^{28}$ and $R^{29}$ are the same of different and each represent a hydrogen atom, a halogen atom, a $C_1-C_{10}$-alkylgroup, a $C_1-C_{10}$-fluoroalkylgroup, a $C_6-C_{10}$-aryl group, a $C_1-C_{10}$-alkoxygroup, a $C_2-C_{10}$-alkenyl group, a $C_7C_{40}$-arylalkylgroup, a $C_8-C_{40}$-arylalkenyl group or a $C_7-C_{40}$-alkylaryl group, or $R^{27}$ and $R^{28}$ or $R^{27}$ and $R^{29}$, in each case form a $C_4-C_6$-alkylring together with the atoms joining them. In $R^{26}$, $M^2$ usually is Si.

$R^{26}$ advantageously is a radical

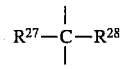

or

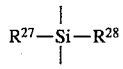

and more advantageously $R^{26}$ represents

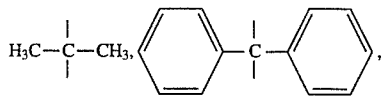

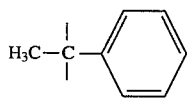

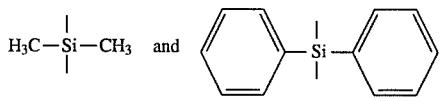

In formula (XI), $M^1$ is most advantageously zirconium. A suitable cocatalyst useful for carrying out the polymerization includes, for example, aluminoxane.

Of the metallocenes of formula (XI) that exhibit $C_1$-symmetry in the portion of the molecule formed by the central atom $M^1$ and the substituents $R^{24}-R^{25}$ (i.e., this molecular portion exhibits no higher symmetry elements at all and can be made to coincide with itself only by rotation by 360°—single axis), the following metallocenes are advantageously utilized: isopropylene-(9-fluorenyl)(1-(3-isopropyl)cyclopentadienyl)-zirconium dichloride, isopropylene-(9-fluorenyl)(1-(3 -methyl)cyclopentadienyl)-zirconium dichloride, diphenylmethylene-(9-fluorenyl)(1-(3 -methyl)cyclopentadienyl)-zirconium dichloride, methylphenylmethylene-(9-fluorenyl)(1-(3-methyl)cyclopentadienyl)-zirconium dichloride, dimethylsilyl-(9-fluorenyl)(1-(3 -methyl)cyclopentadienyl)-zirconium dichloride, diphenylsilyl-(9-fluorenyl)(1-(3-methyl)cyclopentadienyl)-zirconium dichloride, diphenylmethylene-(9-fluorenyl)(1-(3 -ter-tbutyl)cyclopentadienyl)-zirconium dichloride and isopropylene-(9-fluorenyl)(1-(3 -tert-butyl)cyclopentadienyl)-zirconium dichloride and the corresponding hafnium dichlorides.

Throughout this description, the term "$C_1$-symmetry" has its conventional meaning as defined in K. Mislow "Einfhrung in die Stereochemie [Introduction to Stereo-chemistry]", Verlag Chemie, 1st edition 1967, page 23 et seq.

Ligand systems ($R^{24}-R^{26}$)that can exert a different steric interaction on the ligands $R^{22}$ and $R^{23}$ are advantageously used in the present invention. The particular nature of the ligands $R^{22}$ and $R^{23}$ usually has minimal significance when ligand systems $R^{24}-R^2$ are used.

An additional embodiment of the polymerization process used to synthesize the semi-crystallin cycloolefin copolymers of the present invention comprises using a salt-like compound, for example of the formula $R_xNH_{4-x}BR'_4$ or of the formula $R_3PHBR'_4$, as a cocatalyst instead of, or in addition to, an aluminoxane. In these formulae, x represents an integer selected from 1, 2 or 3, R represents a $C_1$–$C_6$-alkylor aryl, which can be the same or different in either formulae, and R' represents aryl, which also can be fluorinated or partly fluorinated. In this embodiment, the catalyst comprises the reaction product of a metallocene of the present invention with one of the compounds mentioned in EP-A 277 004 which is hereby incorporated by reference in its entirety.

If a solvent is added to the reaction mixture, the solvents usually are the customary inert solvents including aliphatic or cycloaliphatic hydrocarbons, gasoline fractions or hydrogenated diesel oil fractions, toluene, chlorobenzene, o-dichlorobenzene or chloronaphthalene.

The metallocene compound usually is used in a concentration, based on the transition metal, of $10^{-3}$ to $10^{-8}$ mol, preferably $10^{-4}$ to $10^{-7}$ mol of transition metal per $dm^3$ of reactor volume. The aluminoxane cocatalyst, when used, usually is used in a concentration of $10^{-4}$ to $10 -1$ mol, preferably $10^{-4}$ to $2 \times 10-2$ mol per $dm^3$ of reactor volume, based on the content of aluminum. In principle, however, higher concentrations of metallocene and aluminoxane also are possible.

The molecular ratios of the polycyclic olefin to the open-chain olefin employed in the preparation of copolymers can be varied within a wide range. Molar ratios of cycloolefin to open-chain olefin of 3:1 to 100:1 are advantageously utilized. The incorporation rate of comonomers can be selected depending on the choice of polymerization temperature and on the concentration of the catalyst components and the molar ratio employed or the pressure of the gaseous open-chain olefin. Incorporation rates of between 45 and 55 mol % of the cyclic components are preferred, and incorporation rates of about 50 mol % of the cyclic components are particularly preferred. Those skilled in the art are capable of varying the polymerization conditions including the molecular ratios, temperature, pressure and concentration of catalyst using conventional polymerization techniques.

The average molecular weight of the semi-crystalline cycloolefin copolymer formed usually can be controlled in a known manner by metering in hydrogen or varying the temperature. The polydispersity ($M_w/M_n$) of these copolymers usually is quite narrow with values of between about 2.0 and about 3.5. After further treatment, these polymers are particularly suitable for film production by extrusion.

It has been found with the aid of NMR spectra that the semi-crystallin cycloolefin copolymers of the present invention also differ significantly in their microstructure from those which have been prepared using conventional metallocene catalysts (cf. FIG. 1). While not intending to be bound by any theory, it is believed that this difference could be based on the fact that the metallocene catalysts described above polymerize alternately because of their specific symmetry. Hence, it is believed that the cycloolefin copolymers thus prepared contain tactic, alternating cycloolefin/olefin sequences that allow structural differentiation by NMR (cf. FIG. 1).

To obtain the requisite film properties, the cycloolefin copolymers obtained should be virtually free from residues of catalyst and solvent. The purification processes described in EP-A 503 422 are inadequate for producing films having the requisite properties described above. To prepare films having the requisite properties in accordance with the present invention, the residual catalyst content advantageously should be below 100 ppm. Throughout this description, "catalyst residues" denote, in particular, the aluminum-containing cocatalysts, since these typically are present in a considerably higher concentration in the polymer. If the aluminum content has fallen to below 100, preferably below 10, more advantageously, below 1 ppm, the content of metallocene catalysts is believed to be even lower and therefore no longer critical. In addition, chlorine-containing solvents, such as hydrochloric acid, should not be used during treatment of the polymers. Residues of such chlorine-containing solvents can lead to undesirable brown colorations of the films.

It also is useful to dissolve the crude cycloolefin copolymers in a solvent, preferably in the presence of a filter auxiliary, and to filter the solution at elevated temperature. When the polymers have been freed from catalyst residues in this manner, they are reprecipitated from the solution. Suitable solvents useful in the present invention include nonpolar, optionally halogenated hydrocarbons, in particular aromatic, aliphatic and cycloaliphatic hydrocarbons, such as Decalin (decahydronaphthalene), Tetralin (tetrahydronaphthalene) chloronaphthalene or o-dichlorobenzene. Solvents having a high boiling point, in particular >100° C. to about 300° C., are advantageously used.

Polar solid substances which are insoluble under the process conditions usually are suitable as filter auxiliaries. Examples of these filter auxiliaries include kieselguhr, prepared from diatomaceous deposits (for example: Celite®545, LuV, Hamburg), perlite prepared from obsidian-like material of volcanic origin (e.g.: Celite® Perlite I-100) or modified cellulose (for example: Diacel). Porous carbon and absorptive asbestos fibers are likewise suitable, although not usually utilized. The temperature typically is maintained at not less than 100° C., advantageously between about 135° C. to about 300° C., and more advantageously from 150°–170° C., during the filtering operation. The dissolved, filtered polymer then is finally precipitated by means of a polar solvent, such as acetone. Those skilled in the art, upon reading the foregoing description and using the aforementioned procedures, are capable of preparing semi-crystalline cycloolefin copolymers meeting the limitations of the present invention.

The films of the present invention can be prepared by various known processes. The films can be cast from solution, but thermoplastic processing generally is more advantageous. Pressing of sheets is particularly suitable for experimental use, but continuous processes, such as extrusion or calendering, are more economical for industrial production.

Extruded films can be shaped as a tube or flat film. Coextrusion is advisable for production of multilayer films. The skilled artisan is familiar with these film-forming techniques and is capable of forming films from the semi-crystallin cycloolefin copolymers of the present invention.

The inventive films usually are oriented for further improving the mechanical properties. Orientation typically is effected by stretching. Usually, the stretching temperatures should be within the range of from about 40° C. below the glass transition temperature (Tg-40° C.) to not more than the melting point $T_m$. Thus, the stretching temperature should satisfy the following relation $(Tg-40) \leq Tg \leq T_m$ wherein Tg is the glass transition temperature and $T_m$ is the melting point of the cycloolefin copolymer. The orientation can be effected uniaxially or biaxially.

Stretching temperatures above Tg are suitable for industrial production because this permits faster production due to the higher stretching speeds that can be achieved. The temperature, stretching rate and stretching ratios should be coordinated with one another such that the film does not tear. The stretching speed preferably is 1–500,000 %/minute. The stretching ratios in the longitudinal and transverse direction are in each case 1.1:1–10:1, preferably 1.5:1–4:1. The area stretching ratio should preferably be 3–20.

In the case of biaxial orientation, the stretching can be carried out simultaneously or sequentially. Tenter processes are suitable for flat films, as well as simultaneous stretching frames. Tubular films usually are oriented biaxially by inflation with simultaneous take-off.

One advantage of semi-crystalline cycloolefin copolymer films of the present invention when compared to the conventional amorphous films is their improved stretchability. Amorphous polymers relax very quickly when stretched above the glass transition temperature Tg if the heat required for stretching is not removed quickly enough. Some of the orientation brought about by the stretching process is then lost again by the relaxation process. A loss of orientation reduces, inter alia, the mechanical strength, rigidity, toughness, hardness and transparency. Relaxation occurs more slowly in semi-crystalline cycloolefin copolymers, however, so that the stretching process, including cooling of the film, is less critical than in the case of amorphous cycloolefin copolymers.

Another advantage of films prepared from semi-crystalline cycloolefin copolymers of the present invention when compared to conventional amorphous copolymers lies in the possibility of increasing the crystallinity of the film in a heat treatment oven after the stretching process. Fixing of the film is achieved in this way, which manifests itself in improved mechanical, chemical and thermal properties. The continuous use temperature ($T_d$) of the film can also be increased by fixing; stresses are broken down. Hence, the dimensional stability and the barrier properties are improved.

It also is possible, by rapid cooling of the extrudate comprising a cycloolefin copolymer capable of crystallization, to produce a prefilm which is not very crystalline or amorphous and then is stretched mono- or biaxially in accordance with the processes described above. In a heat treatment step after the stretching operation, the film crystallizes completely to improve its properties.

The surfaces of the films can be modified to achieve, e.g. adhesion promotion or printability or antistatic or antiadhesion properties. This modification can be effected either by treatment methods such as corona, flame, plasma or oxidation treatment or by application of a coating from a solution or dispersion.

In an additional embodiment of the present invention, the film may contain fine inert particles which improve the slip and winding properties. Such particles, which the film can contain in effective amounts of generally 0–1%, include, for example: $SiO_2$, $Al_2O_3$, silicates having an $SiO_2$ content of at least 30% by weight, amorphous and crystalline alumina minerals, aluminosilicate, oxides of Mg, Zn, Zr and Ti, sulfates of Ca, Mg and Ba, phosphates of Li, Na and Ca (including the monohydrogen salts and dihydrogen salts thereof), benzoates of Li, Na and K, terephthalates of Ca, Ba, Zn and Mn, titanates of Mg, Ca, Ba, Zn, Cd, Pb, Sr, Mn, Fe, Co and Ni, chromates of Ba and Pb, carbon (for example carbon black or graphite), glass (glass powder and glass beads), carbonates of Ca and Mg, fluorspar, sulfides of Zn and Mo, organic polymer substances, such as polytetrafluoroethylene/polyethylene, talc, lithium fluoride and the Ca, Ba, Zn and Mn salts of organic acids.

The films of the present invention also can include suitable additives including, for example, stabilizers, lubricants or antioxidants. In principle, additives which are used for polyolefins, such as polyethylene or polypropylene, are also suitable for the cycloolefin copolymer films. UV stabilizers which can be employed are, for example, absorbers, such as hydroxyphenylbenzotriazoles, hydroxybenzophenones, formamidine or benzylidene-camphor, quenching agents, such as cinnamic acid esters or nickel chelates, agents which trap free radicals, such as sterically hindered phenols, hydroperoxide-decomposing agents, such as nickel complexes or zinc complexes of sulfur-containing compounds, or photostabilizers of the HALS type, and mixtures thereof. Useful lubricants include, for example, fatty acids and esters, amides and salts thereof, silicones or waxes, such as PP waxes or PE waxes. Useful antioxidants include, for example, agents which trap free radicals, such as substituted phenols and aromatic amines, and/or peroxide-decomposing agents, such as phosphites, phosphonates and thio compounds.

The film according to the present invention also can be a single- or multilayer film. At least one layer comprises mainly, i.e. to the extent of at least 85% by weight, preferably to the extent of 90–100% by weight, the cycloolefin copolymers described above. The monofilm is an advantageous embodiment of the present invention.

In an additional embodiment of the invention, the main layer according to the invention carries one or two thin polymer top layers having lower softening points than the main layer. If the thin polymer top layer is semi-crystalline, its melting point $T_m$ should preferably be at least 20° C. below the $T_m$ of the main layer. In the case of a thin amorphous top layer, the glass transition temperature $T_g$ thereof should be preferably at least 20° C. below the $T_m$ of the main layer. In addition, the film can be coated for modification of its properties.

The film according to the invention can include other compatible or non-compatible polymers for improving its properties. These polymers can form separate layers or be mixed with the cycloolefin copolymers. Examples of useful polymers include polyethylene, polypropylene, polymethylbut-1-ene, poly(4-methylpent-1-ene), polybut-1-ene and polystyrene, polyvinyl chloride, polyvinylidene chloride, polyvinyl fluoride, polytetrafluoroethylene, polychloroprene, polyacrylate, polymethacrylate, polyacrylamide, polyacrylonitrile, acrylonitrile/butadiene/styrene copolymers, acrylonitrile/styrene copolymers and acrylonitrile/styrene/acrylate copolymers, polyvinyl alcohol, polyvinyl acetate, polyvinyl stearate, polyvinyl benzoate, polyvinyl maleate, polyvinylbutyral, polyallyl phthalate, polyallyl melamine, copolymers of the above-mentioned monomers, such as ethylene/vinyl acetate copolymers, polyethylene oxide and polymers of bisglycidyl ethers, polyoxymethylene, polyoxyethylene and polyoxymethylene/ethylene oxide copolymers, polyphenyl oxide polymers, polycarbonates, polysulfones, polyurethanes, nylon 6, nylon 66, nylon 11 and nylon 12, polyethylene terephthalate, polybutylene terephthalate and poly-1,4-dimethylolcyclohexane terephthalate, polyethylenenaphthalate (PEN), polyethylenenaphthalatebibenzoate (PENBB), phenol-formaldehyde resins and melamine-formaldehyde resins, cellulose, cellulose propionates and cellulose ethers and proteins.

The films according to the invention usually have glass transition temperatures Tg satisfying the relation 100°0 C. $Tg \leq 250°$ C. and melting points satisfying the relation Tm of 200° C. $T_m \leq 500°$ C. Their continuous use temperatures $T_D$ usually satisfy the relation $Tg < T_D < T_m$.

The tensile elasticity moduli E (GPa) of the films according to the invention, determined in accordance with DIN 53 455, typically are within the range of 1.5 GPa≦E≦8 GPa and advantageously within the range of 2 GPa E 5 GPa. The tear strength $\sigma_R$ usually is within the range of 20 MPa≦$\sigma_R$≦400 MPa and advantageously within the range of 30 MPa≦$\sigma_R$≦150 MPa. The elongation at break 6R usually is within the range of 1%≦$\epsilon_R$≦100% and advantageously within the range of 1%≦$\epsilon_R$≦60%.

The water uptake of films made in accordance with the present invention typically is less than 0.1% and advantageously between 0 and 0.05%. A particular advantage of the semi-crystalline cycloolefin copolymer films of the invention when compared to the amorphous copolymer films is their excellent resistance to solvents, particularly to aliphatic, cycloaliphatic and aromatic hydrocarbons. The films of the present invention are therefore useful as capacitor films, electrically insulating films, release films, reproduction films, adhesive tape films, films for the production of film keyboards and film switches, as packaging films or as substrates for liquid crystal displays. Those skilled in the art are capable of using the polymeric films of the present invention for the above-stated purposes.

The invention will be illustrated in more detail below by reference to the following non-limiting examples.

EXAMPLES

The following analytical methods were used in the following examples. Those skilled in the art are familiar with the following techniques and are capable of measuring the following characteristics using these techniques.

The glass transition temperature ($T_g$) was determined as the sudden increase in thermal capacity in the DSC diagram. The DSC diagrams were recorded with a Perkin-Elmer DSC 7.

The viscosity number (VN) was determined in accordance with DIN 53 728 in decalin at 135° C.

The mechanical properties of the films were investigated in accordance with DIN 53 455 using a tensile tester 1445 from Zwick on specimens 15 mm wide over a clamped length of 100 mm. The tensile E modulus was determined in the elongation range from 0.3 to 0.5% at an elongation rate.

The tear strength and elongation at break were determined at 100 mm/minute.

The ball indentation hardness was determined in accordance with ISO 2039, Part 1 (30 s value).

A density gradient column was used for determination of the density.

The residual catalyst content was determined by X-ray fluorescence measurement.

Example 1

A clean and dry 75 dm³ reactor was filled with ethylene, and 15 dm³ of norbornene and 15 dm³ of Decalin (decahydronaphnthalene) were introduced. The solution was saturated with ethylene by forcing in ethylene several times at 6 bar pressure. A pressure of 2.5 bar (increased pressure) was established. Approximately 500 cm³ of a toluene solution of methylaluminoxane (10.1% by weight of methylaluminoxane of molecular weight 1300 g/mol according to cryoscopic determination) then were introduced into the reactor and the mixture was stirred at 70° C. for 15 minutes. A solution of 150 mg of isopropylene-(9-fluorenyl)(1-(3-methyl-cyclopentadienyl)-zirconium dichloride in 500 cm³ of a toluene solution of methylaluminoxane then was added after preactivation for 15 minutes. As recognized by those skilled in the art, hydrogen can be metered in before addition of the catalyst in order to regulate the molecular weight. Polymerization was carried out at 70° C. while stirring (750 revolutions per minute), the ethylene pressure being kept at 2.5 bar by topping up.

Approximately 50 l of decalin were introduced into a second stirred tank (150 dm³) and 500 g of diatomaceous earth (Celite®, LuV Hamburg) were suspended therein. Water, (200 ml) were dispersed in the mixture, and the water was thereby absorbed by the diatomaceous earth. Antioxidant (0.5 g) (Hostanox SE 10) and 0.5 g of peroxide-decomposing agent (Hostanox 03) then were added to the suspension and the temperature was controlled at 90° C.

After a polymerization reaction time of 60 minutes, the reaction solution of the first tank was drained rapidly into the second stirred tank. The polymer mixture was heated at 170° C., while stirring, and a pressure of about 2 bar was thereby achieved.

A filter cake of 500 g of CeliteÛ, suspended in 10 l of a hydrogenated diesel oil fraction, was built up on a filter fabric of a 120 l pressure suction filter and the suction filter was then temperature-controlled at 160° C. The polymer mixture was filtered over the pressure suction filter. The filter was operated in such a manner that the filtrate was first conveyed back into the suction filter for 15 minutes (i.e. pumped in circulation). A pressure of 2.8 bar of nitrogen was built up over the solution.

The resulting filtered polymer mixture then was stirred into 500 l of acetone by means of a disperser (Ultraturrax), and thereby precipitated. The acetone suspension was circulated over a 680 l stirred pressure suction filter with the base valve open. After the base valve had been closed, the mixture was filtered. The polymeric solid was washed three times with acetone. Stabilizer (50 g of Irganox.® 1010, Ciba) were added to the last wash.

The acetone then was pressed off completely and the product was pre-dried at 1000° C. for three hours. Final drying was carried out under 10 mbar at 160° C. under a gentle blanket of nitrogen in a drying cabinet for 10 hours.

Approximately 2100 g of colorless pulverulent polymer were obtained. The glass transition temperature of the polymer (Tg) was 126° C. and the melting point (Tm) was 284° C. After dissolving at 180° C. for one hour, the viscosity number was determined as 59 ml/g at 135° C. The residual catalyst content of the polymer was 18 ppm.

EXAMPLES 2 to 7

Polymerizations were carried out in accordance with Example 1, except that the increased ethylene pressures was varied according to Table 1.

TABLE I

| Example | Amount of catalyst (g) | Ethylene pressure (bar) | Reaction time (min) | Yield (kg) | VN cm³/g | $T_g$ (°C.) | $T_m$ (°C.) | Norbornene content (in mol %) | Degree of swelling in toluene (% by weight) |
|---|---|---|---|---|---|---|---|---|---|
| 2 | 0.5 | 0.3 | 100 | 2.1 | 35 | 141 | 239 | 54 | 54 |
| 3 | 0.5 | 0.5 | 80 | 1.9 | 43 | 137 | 260 | 53 | 39 |
| 4 | 0.25 | 1.0 | 90 | 1.7 | 47 | 133 | 275 | 52 | 0.2 |
| 5 | 0.15 | 2.0 | 60 | 1.1 | 53 | 129 | 279 | 51 | 0.2 |
| 1 | 0.15 | 2.5 | 60 | 1.4 | 59 | 126 | 284 | 50 | 0.1 |
| 6 | 0.15 | 3.5 | 60 | 1.7 | 74 | 119 | 267 | 48 | 32 |
| 7 | 0.1 | 6.0 | 40 | 1.9 | 93 | 105 | 232 | 46 | 40 |

*Degree of swelling: percentage weight increase after storage in toluene at room temperature for 14 days

EXAMPLE 8

(Comparison Example)

A clean and dry 1.5 dm³ reactor was filled with ethylene, and 600 cm³ of an 85% strength by weight solution of norbornene in toluene were introduced. The solution was saturated with ethylene by forcing in ethylene several times at a pressure of about 6 bar. A pressure of 2 bar (increased pressure) therefore was established in the reactor. A toluene solution (5 cm³) containing methylaluminoxane (10.1% by weight of methylaluminoxane of molecular weight 1300 g/mol according to cryoscopic determination) was introduced into the reactor and the mixture was stirred at 40½° C. for minutes. A solution of 5 mg of isopropylene-(9-fluorenyl)(1-(3-methyl)-cyclopentadienyl)-zirconium dichloride in 5 cm³ of a toluene solution of methylaluminoxane then was added after preactivation for 15 minutes. Again, hydrogen can be metered in before addition of the catalyst to regulate the molecular weight.

Polymerization was carried out at 40° C. for one hour, while stirring (750 revolutions per minute), and the ethylene pressure was maintained at 2 bar by topping up. The reaction solution was drained into a vessel and poured rapidly into 5 dm³ of acetone, and the mixture was stirred for 10 minutes and then filtered.

The resulting solid was washed several times with 10% strength hydrochloric acid and acetone in alternation. The solid was washed neutral and stirred again with acetone. The re-filtered polymer was dried at 80° C. under a pressure of 0.2 bar for 15 hours.

A colorless polymer (54 g) was obtained having a viscosity number (VN) of 131 ml/g, a glass transition temperature (Tg) of 133° C. and a melting point (Tm) of 289° C. According to the NMR spectrum, the norbornene/ethylene incorporation ratio was about 50 mol % of norbornene to 50 mol % of ethylene. The residual catalyst content was 315 ppm.

EXAMPLE 9

(Comparison Example)

A clean and dry 75 dm³ polymerization reactor with a stirrer was flushed with nitrogen and then with ethylene, and 22000 g of norbornene melt were introduced at 50° C. While stirring, the reactor then was maintained at a temperature of 50° C. and 15 bar of ethylene (increased pressure) were forced in.

Thereafter, 580 cm³ of a toluene solution of methylaluminoxane (MAO solution, 10.1% by weight of methylaluminoxane of molecular weight 1300 g/mol according to cryoscopic determination) were metered into the reactor and the mixture was stirred at 50° C. for 15 minutes, the ethylene pressure being maintained at 15 bar by topping up. At the same time, about 1000 mg of diphenylmethylene-(cyclopentadienyl)-(9-fluorenyl)-zirconium dichloride (metallocene catalyst) were dissolved in 1000 ml of MAO solution (concentration and quality as above) and preactivated by allowing to stand for 15 minutes. The solution containing this complex then was metered into the reactor, and immediately thereafter, 3.5 l of hydrogen were metered in via a sluice (the hydrogen served to regulate the molecular weight). Polymerization then was carried out at 50° C. for 45 minutes, while stirring (700 revolutions per minute), and the ethylene pressure was maintained at 15 bar by topping up.

Further treatment of the polymerization solution was carried out analogously to Example 1, and the filtration was carried out at 70° C. The product obtained after filtration was dried at 80° C. under 0.2 bar for 15 hours resulting in about 4500 g of product. The product had a viscosity number (VN) of 103 cm³/g and a glass transition temperature (Tg) of 123° C. No melting point, however was detected. The residual catalyst content was 2.1 ppm.

EXAMPLE 10

Production of a non-oriented, semi-crystalline film.

Injection molded sheets 4 mm thick were produced from the polymer prepared according to Example 1 and were pressed at 300° C. in a sheet press for 15 minutes to produce films 400 µm thick with dimensions of 200×200 mm.

The film was glass-clear and showed no yellow coloration. The properties of the film are illustrated in Table 2.

EXAMPLE 11

(Comparison Example)

Production of a non-oriented, semi-crystalline film which is not according to the invention.

A film was produced as described in Example 10 from the polymers prepared according to Example 8. This film had a distinct brownish-yellow coloration. The film further exhibited gel particles (specks), which were most likely formed by local crosslinkings of the polymer. Clouding also was found, which usually can be attributed to catalyst residues. The properties of this comparative film are illustrated in Table 2.

EXAMPLE 12

(Comparison Example)

Production of a non-oriented, amorphous film.

A film was produced as described in Example 10 from the polymers prepared according to Example 9. The film was glass-clear and showed no yellow coloration. The properties of this comparative film are illustrated in Table 2 below.

TABLE 2

| Comparison of the properties | | Example 10 | Example 11 | Example 12 |
|---|---|---|---|---|
| E modulus | GPa | 4 | 3.6 | 3.2 |
| Tear strength | MPa | 60 | 54 | 46 |
| Elongation at break | % | 3 | 3 | 3 |
| $T_g$ | °C. | 126 | 133 | 123 |
| $T_m$ | °C. | 284 | 289 | — |
| Density | g/cm$^3$ | 1.032 | 1.030 | 1.018 |
| Ball indentation hardness N/mm$^2$ | N/mm$^2$ | 254 | 246 | 200 |
| Light transmission[1] | % | 82 | 41 | 87 |
| Clouding[2] | % | 5 | 12 | 3 |
| Resistance to solvent[3] | | | 0.1 | soluble |
| Toluene | ΔM | 0.1 | 0.1 | soluble |
| Cyclohexane | in % | 0.1 | 0 | disintegrates |
| Hexane | | 0 | 0.9 | deliquesces-disintegrates |
| Dichloromethane | | 0.8 | 1.0 | soluble |
| Chloroform | | 1.1 | | |

[1] measured at the wavelength λ = 500 nm
[2] measured in accordance with ASTM-D 1003-61 (Gardner)
[3] The films were weighed (M1) and then stored in toluene, cyclohexane, hexane, chloroform and dichloromethane at room temperature for 24 hours. The films were then washed by dipping briefly in pentane. Adhering solvent evaporated off within a few minutes. The percentage change in weight was determined by renewed weighing (M2) at the latest 3 minutes after the pentane wash and obtaining the difference (M2 − M1).

FIG. 1 illustrates the $^{13}$C-NMR spectra of the polymers obtained in accordance with Example 1 (metallocene catalyst with Cl-symmetry in the part of the metallocene molecule formed by M$^1$ and R$^{24}$ and R$^{25}$) and polymers obtained in accordance with Example 9 (conventional metallocene catalyst). The differences between the inventive polymers and the comparative polymers are readily apparent from the above tables and FIG. 1.

The invention has been described in detail above by reference to particularly preferred embodiments illustrated in the foregoing examples. Those skilled in the art will appreciate, however, that various modifications may be made to the present invention without departing from the spirit and scope thereof.

What is claimed is:

1. An oriented film having at least one layer comprising a cycloolefin copolymer which includes 0.1 to 99.9% by weight based on the total amount of monomers, of at least one monomer of the formulae I, II, III, IV, V, VI, VII, VIII or IX

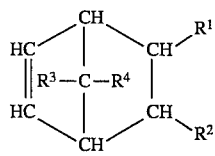

(I)

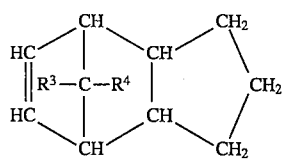

(II)

(III)–(IX) structural formulae wherein:
R$^1$ to R$^8$ are the same or different and each represent a hydrogen atom, a C$_6$–C$_{16}$-aryl or a C$_1$–C$_8$-alkyl radical, wherein the various groups in the aforementioned formulae may have he same or a different meaning, and in wherein R$^9$ to R$^{20}$ are the same or different and each represent a C$_1$–C$_{16}$-alkyl, C$_2$–C$_{16}$-alkenyl or C$_6$–C$_{16}$-aryl radical, or in wherein the radical pairs R$^9$/R$^{10}$, R$^{11}$/R$^{12}$, R$^{13}$/R$^{14}$, R$^{15}$/R$^{16}$, R$^{17}$/R$^{18}$ and/or R$^{19}$/R$^{20}$, together with the carbon atom or atoms to which they are bonded, form a C$_4$–C$_8$-cycloalkyl radical, said cycloolefin copolymer further comprising from 99.9 to 0.1% by weigh, based on the total amount of monomers, of at least one acyclic olefin of the formula X $$H_2C=CH-R^{21} \quad (X)$$

in which $R^{21}$ is a hydrogen atom or a $C_1$–$C_{16}$-alkyl or $C_6$–$C_{16}$-aryl radical, and wherein the cycloolefin copolymer has a catalyst residue content of <100 ppm.

2. A film as claimed in claim 1, wherein the glass transition temperature of the cycloolefin copolymer is >100°0 C. and the melting point of the cycloolefin copolymer is >200° C.

3. A film as claimed in claim 1, wherein the copolymer includes a cyclic monomer of the formula I, II, III, IV, V or VI which is symmetric.

4. A film as claimed in claim 1, wherein the incorporation ratio of total monomers of the formula I, II, III, IV, V, VI, VII, VIII and IX to monomer of the formula X is about 50/50 mol %.

5. A film as claimed in claim 1, wherein the copolymer includes a monomer of the formula I which is norbornene.

6. A film as claimed in claim 1, wherein the copolymer includes a monomer of the formula I which is tetracyclododecene.

7. A film as claimed in claim 1, wherein the cycloolefin copolymer is prepared by use of metallocene catalysis.

8. A film as claimed in claim 1, wherein the cycloolefin copolymer comprises norbornene and ethylene in a molar ratio of 50:50.

9. A film as claimed in claim 1, wherein said film is a single-layer film.

10. A film as claimed in claim 1, wherein said film is uniaxially oriented.

11. A film as claimed in claim 1, wherein said film is biaxially oriented.

12. A film as claimed in claim 1, further comprising >0 to 2% of inert particles.

13. A film as claimed in claim 7, wherein said metallocene catalyst is of the formula XI $$R^{26} \diagdown \underset{\underset{R^{25}}{|}}{\overset{\overset{R^{24}}{|}}{M^1}} \diagup \begin{matrix} R^{22} \\ R^{23} \end{matrix}$$

wherein $M^1$ represents titanium, zirconium, hafnium, vanadium, niobium or tantalum, $R^{22}$ and $R^{23}$ are the same or different and each represent a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{24}$ and $R^{25}$ are the same or different and each represent a mono- or polynuclear hydrocarbon radical, that is capable of forming a sandwich structure with the central atom $M^1$, $R^{26}$ represents $$-\underset{\underset{R^{28}}{|}}{\overset{\overset{R^{27}}{|}}{M^2}}-, \quad -\underset{\underset{R^{28}}{|}}{\overset{\overset{R^{27}}{|}}{M^2}}-\underset{\underset{R^{28}}{|}}{\overset{\overset{R^{27}}{|}}{M^2}}-, \quad -\underset{\underset{R^{28}}{|}}{\overset{\overset{R^{27}}{|}}{M^2}}-CR_2^{29}, \quad -\underset{\underset{R^{28}}{|}}{\overset{\overset{R^{27}}{|}}{C}}-,$$

$$-O-\underset{\underset{R^{28}}{|}}{\overset{\overset{R^{27}}{|}}{M^2}}-, \quad -\underset{\underset{R^{28}}{|}}{\overset{\overset{R^{27}}{|}}{C}}-\underset{\underset{R^{28}}{|}}{\overset{\overset{R^{27}}{|}}{C}}-$$

$BR^{28}$, $AlR^{28}$, —Ge—, —Sn—, —O—, —S—, SO, $SO_2$, $NR^{28}$, CO, $PR^{28}$ or $P(O)R^{28}$, wherein $R^{27}$, $R^{28}$ and $R^{29}$ are the same or different and each represent a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_6$–$C_{40}$-arylalkenyl group or a $C_7$–$C_{40}$-alkylaryl group, or $R^{27}$ and $R^{29}$ or $R^{28}$ and $R^{29}$, in each case form a cyclic ring with the atoms joining them, and $M^2$ represents silicon, germanium or tin, wherein the portion of the metallocene molecule formed by $M^1$ and the substituents $R^{24}$ and $R^{25}$ have $C_1$-symmetry or, if $R^{24}$ and $R^{25}$ are identical, they are in the meso form.

14. A film as claimed in claim 13, wherein said metallocene catalyst is used in conjunction with a cocatalyst that comprises an aluminoxane of the formula XII $$\underset{R^{30}}{\overset{R^{30}}{\diagdown}}Al-O-\left[\underset{\underset{}{|}}{\overset{\overset{R^{30}}{|}}{Al}}-O\right]_n-Al\underset{R^{30}}{\diagup}^{R^{30}} \quad (XII)$$

for linear type polymerization and/or an aluminoxane of the formula XIII $$-\left[\underset{}{\overset{\overset{R^{30}}{|}}{Al}}-O\right]_{n+2}- \quad (XIII)$$

for the cyclic type of polymerization, wherein, in the formulae XII and XIII, the radicals $R^{30}$ are the same or different and each represents a $C_1$–$C_6$-alkyl group, phenyl or benzyl and n is an integer from 0 to 50.

15. A capacitor film comprising a film as claimed in claim 1.

16. A reproduction film comprising a film as claimed in claim 1.

17. Film keyboards or film switches comprising a film as claimed in claim 1.

18. A substrate for liquid crystal displays comprising a film as claimed in claim 1.

19. A packaging film comprising a film as claimed in claim 1.

20. A method of making a film as claimed in claim 1, comprising the steps of:

(a) polymerizing a cycloolefin and olefin in the presence of a metallocene catalyst to produce a cycloolefin copolymer;

(b) separating the cycloolefin copolymer;

(c) purifying the copolymer such that it has a catalyst residue of less than 100 ppm, and (d) preparing a film from said cycloolefin copolymer.

21. A film as claimed in claim 1, wherein the cycloolefin copolymer has an aluminum catalyst residue of less than 10 ppm.

* * * * *